US006245985B1

(12) United States Patent
Sasaki et al.

(10) Patent No.: US 6,245,985 B1
(45) Date of Patent: Jun. 12, 2001

(54) DATA CONVERTER FOR ENHANCING RESOLUTION, METHOD FOR CONVERTING DATA CODES AND KEYBOARD MUSICAL INSTRUMENT EQUIPPED WITH THE DATA CONVERTER

(75) Inventors: Tsutomu Sasaki; Tomoyuki Ura; Yuji Fujiwara, all of Shizuoka (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 09/419,621

(22) Filed: Oct. 15, 1999

(30) Foreign Application Priority Data

Oct. 23, 1998 (JP) ................................................ 10-302950

(51) Int. Cl.[7] ................................ G10H 5/00; G01P 3/00

(52) U.S. Cl. ............................ 84/658; 84/423 R; 84/461

(58) Field of Search .............................. 84/600, 653–654, 84/657–658, 423 R, 424, 433, 439–440, 461–462

(56) References Cited

U.S. PATENT DOCUMENTS 5,731,530 * 3/1998 Fujiwara et al. ....................... 84/462
5,922,983 * 7/1999 Muramatsu ............................ 84/626
6,051,762 * 4/2000 Fuliwara et al. ....................... 84/461
6,075,196 * 6/2000 Fujiwara et al. ....................... 84/645

FOREIGN PATENT DOCUMENTS 9-54584 2/1997 (JP) .

* cited by examiner

*Primary Examiner*—Robert E. Nappi
*Assistant Examiner*—Marlon Fletcher
(74) *Attorney, Agent, or Firm*—Morrison & Foerster

(57) ABSTRACT

An automatic player piano has key sensors for producing digital key position signals representative of current key positions and a recording unit for producing pieces of music data information on the basis of the key motions; however, the key sensors have individualities, and vary the values of the digital key position signals in different ranges, respectively; the recording unit selects different components bits from each of the digital key position signal depending upon the value at a reference point so as to make the difference between the ranges small.

10 Claims, 6 Drawing Sheets

DATA CONVERTER FOR ENHANCING RESOLUTION, METHOD FOR CONVERTING DATA CODES AND KEYBOARD MUSICAL INSTRUMENT EQUIPPED WITH THE DATA CONVERTER

FIELD OF THE INVENTION

This invention relates to a data converter and, more particularly, to a data converter incorporated in a keyboard musical instrument and a method for converting data codes.

DESCRIPTION OF THE RELATED ART

While a pianist is playing a piano, he or she selectively depresses the black/white keys and, thereafter, releases them so as to generate acoustic tones. The depressed black/white key actuates the associated damper mechanism and the associated key action mechanism. The depressed black/white key lifts the damper felt, and the damper felt is spaced from the associated set of strings so as to allow the set of strings to vibrate. On the other hand, the key action mechanism drives the associated hammer for rotation, and the hammer felt strikes the set of strings. Then, the strings vibrate, and generate the acoustic tone. When the pianist releases the depressed black/white key, the black/white key returns toward the rest position. The released black/white key brings the damper felt into contact with the set of strings, again, and damps the vibrations of the set of strings. This results in extinguish of the acoustic tone. If the pianist depresses pedals, i.e., a damper pedal, a sustaining pedal and a soft pedal, the pedal mechanisms impart predetermined effects to the acoustic tones. Thus, the acoustic piano repeats the loop having depressing a black/white key, striking against the strings, releasing the black/white key and damping the vibrations during the performance, and the pedals selectively impart the expressions to the acoustic tones.

An automatic player piano is the acoustic piano equipped with a recording system and a playback system. While a pianist is playing the acoustic piano, each of the black/white keys generates the acoustic tone through the above-described loop, and the pedal mechanisms selectively impart the expressions to the acoustic tones. The recording system monitors the black/white keys so as to generate pieces of music data information representative of the performance. The pieces of music data information are stored in a suitable information storage medium. Otherwise, a tone generator and a sound system produce electronic sounds on the basis of the pieces of music data information in a real time fashion. When the pianist instructs the automatic player piano to reproduce the performance, the playback system reads out the pieces of music data information from the information storage medium, and the actuators selectively actuate the black/white keys and the pedals.

An automatic player piano may be equipped with a silent system. The silent system includes a hammer stopper, which is usually provided between the hammer shanks and the sets of strings. The hammer stopper is changed between a free position and a blocking position. While a pianist is playing a tune on the keyboard, the black/white keys are selectively depressed, and the hammer assemblies escape from the associated jacks. Then, the hammer assembly associated with a depressed key starts a free rotation. The hammer stopper in the free position allows the hammer to strike the set of strings, and the strings vibrate for generating an acoustic tone. However, if the hammer stopper is in the blocking position, the hammer assembly rebounds on the hammer stopper before striking the strings, and any acoustic tone is not generated. A key sensor monitors the associated black/white key, and reports the key motion to a tone generator. The tone generator produces a tone signal, and an electronic sound is reproduced through a headphone.

A shutter plate attached to the associated key and a photo sensor mounted on the key bed form in combination a typical example of the key sensor. However, the prior art key sensor merely detects a couple of points on the trajectory of the associated key, and a data processor calculates the key velocity on the basis of the distance between the detecting points and a lapse of time therebetween.

Another prior art key sensor available for an automatic player piano is disclosed in Japanese Patent Publication of Unexamined Application (laid-open) No. 9-54584. The prior art key sensor continuously detects the key moved on the trajectory, and generates an analog key position signal representative of the current key position on the trajectory.

An opto-electronic sensing device is disclosed in U.S. Pat. No. 5,001339, and the U.S. Patent was assigned to Gulbransen Incorporated. The prior art opto-electronic sensing device is also available for detecting a key motion of an acoustic piano. The opto-electronic sensing device has a flag held in contact with the lower surface of the key at all times, and an opto-electronic sensor monitors the flag so as to generate an output signal indicative of the current position of the flag and, accordingly, the key.

The prior art key sensor disclosed in the Japanese Patent Publication of Unexamined Application supplies the analog key position signal to an analog-to-digital converter, and the analog-to-digital converter converts the analog key position signal to a digital key position signal. The digital key position signal has a bit string of a fixed length. If the potential level of the analog key position signal is too high to be expressed by the fixed-length bit string, the digital key position signal does not accurately represent the current key position due to overflow. On the other hand, if the bit string is too long to express the variation of the potential level, the digital key position signal merely has a low resolution of the current key position due to a narrow dynamic range.

If the digital key position signal has a bit string longer than now, the digital key position signal is prevented from the overflow. However, there remains the low resolution. The analog-to-digital converter is usually connected to a data processor associated with a random access memory. The long fixed-length digital key position signal increases the load of the data processor, and requires the random access memory to have a large data storage capacity. On the other hand, if the digital key position signal has a bit string shorter than now, the resolution is improved. However, the overflow will be frequently takes place, and the digital key position signal is not reliable. Thus, there is a trade-off between the reliability and the resolution.

In order to compromise the trade-off, the manufacturer optimizes the output potential level of the analog key position signal before delivery from the factory. However, aged deterioration is unavoidable. The data processor suffers from a low resolution due to the narrow dynamic range of the digital key position signal.

Moreover, the data processor usually processes a data code in the form of $2^n$. When the bit string of the digital key position signal is expressed in the form of $2^n$, the increase of the bit string results in a characteristic n much longer than now, and the data processor encounters difficulty in the data processing.

SUMMARY OF THE INVENTION

It is therefore an important object of the present invention to provide a data converter, which converts a digital key position signal to a data code to be processed by a data processor at a high resolution without an overflow.

It is also an important object of the present invention to provide a method used in the data converter.

It is also an important object of the present invention to provide a keyboard musical instrument equipped with the data converter.

In accordance with one aspect of the present invention, there is provided a data converter for converting first digital codes represented by a first bit string to second digital codes represented by a second bit string different in the number of component bits from the first bit string, and the data converter comprises a rank assignor analyzing values of the first digital codes generated under reference state and assigning one of ranks representative of different parts of the first bit string to each of the first digital codes depending upon the value under the reference state and an extractor connected to the rank generator and extracting the part of the first bit string specified by the afore-said one of the ranks from the aforesaid each of the first digital codes for generating associated one of the second digital codes.

In accordance with another aspect of the present invention, there is provided a method for converting first digital codes represented by a first bit string to second digital codes represented by a second bit string different in the number of component bits from the first bit string, and the method comprises the steps of acquiring values of the first digital codes generated under reference state, analyzing the values so as to assign one of ranks representative of different parts of the first bit string to each of the first digital codes depending upon the value under the reference state, acquiring a value of each of the first digital codes generated regardless of the reference state and extracting the part of the first bit string specified by the aforesaid one of the ranks from the aforesaid each of the first digital codes for generating associated one of the second digital codes.

In accordance with yet another aspect of the present invention, there is provided a keyboard musical instrument for generating pieces of music data information representative of a performance thereon comprising plural manipulators movable along respective trajectories between respective home positions and respective limit positions, a sound generating system generating sounds and changing an attribute of the sounds depending upon current positions of the plural manipulators selectively depressed between the home positions and the limit positions, plural position sensors respectively associated with the plural manipulators and producing digital position signals expressed by a first bit string and representative of the current positions, respectively, a data converter including a rank assignor analyzing values of the digital position signals generated under reference state and assigning one of ranks representative of different parts of the first bit string to each of the digital position signals depending upon the value under the reference state and an extractor connected to the rank generator and extracting the part of the first bit string specified by the aforesaid one of the ranks from the aforesaid each of the digital position signals for generating associated one of the digital data signals expressed by a second bit string different in the number of component bits from the first bit string and a data processor supplied with the associated one of the digital data signals and supplying a part of music data information to the sound generating system so as to make the sound generating system to change the attribute of the sounds.

BRIEF DESCRIPTION OF THE DRAWINGS

The features and advantages of the data converter, the method and the keyboard musical instrument will be more clearly understood from the following description taken in conjunction with the accompanying drawings in which.

DESCRIPTION OF THE PREFERRED EMBODIMENTS

Figure 1:
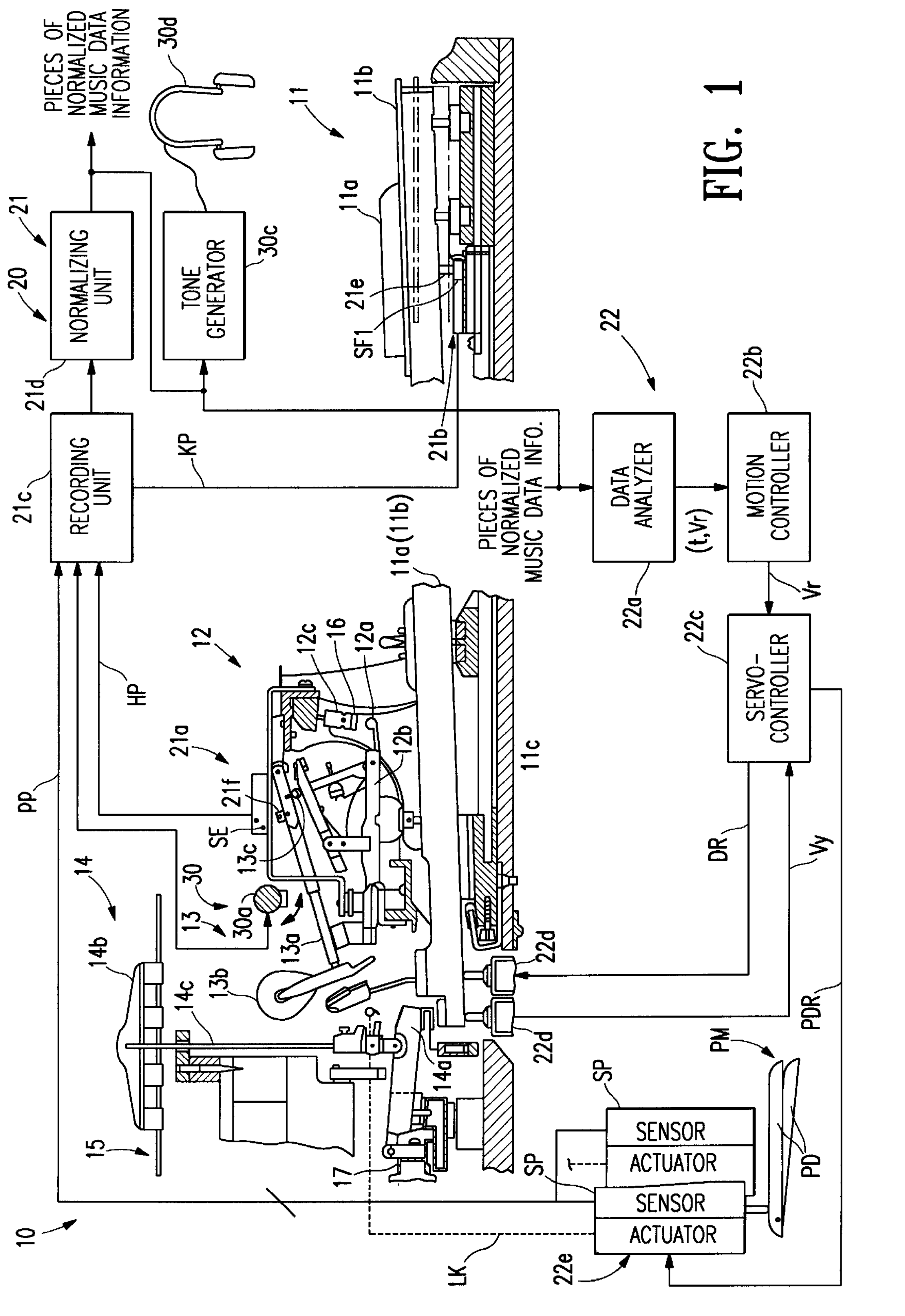
FIG. 1 is a schematic view showing a silent automatic player piano according to the present invention.

Referring first to FIG. 1 of the drawings, a silent automatic player piano embodying the present invention largely comprises an acoustic piano 10, an automatic playing system 20 and a silent system 30. In this instance, the acoustic piano 10 is a grand piano. However, an upright piano is available for the silent automatic player piano according to the present invention. In the following description, term "front" means a position closer to a pianist than a "rear" position.

The acoustic piano 10 is broken down into a keyboard 11, key action mechanisms 12, hammer assemblies 13, damper mechanisms 14, sets of strings 15 and a pedal system PM. Black keys 11*a* and white keys 11*b* are laid on the well-known pattern, and form in combination the keyboard 11. In this instance, eighty-eight black/white keys 11*a*/11*b* are incorporated in the keyboard 11. The self-weight of each black/white key 11*a*/11*b* keeps the black/white key 11*a*/11*b* at a rest position. When force is exerted on the front portion of the black/white key 11*a*/11*b*, the black/white key 11*a*/11*b* is downwardly moved, and reaches an end position.

The key action mechanisms 12 are respectively associated with the black/white keys 11*a*/11*b*. The key action mechanism 12 includes a jack 12*a* turnable around a whippen assembly 12*b* and a regulating button 12*c*. Each of the hammer assemblies 13 is associated with one of the key action mechanisms 12 and one of the sets of strings 15. The hammer assemblies 13 are driven for rotation by the associated key action mechanisms 12 actuated by the black/white keys 11*a*/11*b*, respectively. The hammer assembly 13 includes a hammer shank 13*a* turnable around action brackets 16, a hammer head 13*b* attached to the leading end of the hammer shank 13*a* and a hammer roller 13*c* connected to the hammer shank 13*a*. When the associated black/white key 11*a*/11*b* is in the rest position, the hammer roller 13*c* is held in contact with the jack 12*b*. Each of the damper mechanisms 14 is associated with one of the black/white keys 11*a*/11*b* and one of the sets of strings 15. The associated black/white key 11*a*/11*b* spaces the damper mechanism 14 from the associated set of strings 15 on the way to the end position, and brings it into contact with the associated set of strings 15 on the way toward the rest position. The damper mechanism 14 includes a damper lever 14*a* turnable with respect to a damper rail 17 a damper head 14*b* spaced from and brought into contact with the associated set of strings 15 and a damper wire 14*c* connected between the damper lever 14*a* and the damper head 14*b*.

A capstan button 11*c* projects from the rear portion of each black/white key 11*a*/11*b*, and is held in contact with the whippen assembly 12*b*. While the black/white key 11*a*/11*b* is being depressed from the rest position toward the end position, the capstan button 11*c* upwardly pushes the whippen assembly 12*b*, and the whippen assembly 12*b* turns in the counter clockwise direction together with the jack 12*a*. The black/white key 11*a*/11*b* further pushes the damper lever 14*a* upwardly, and causes the damper lever 14*a* to turn in the counter clockwise direction. The damper lever 14*a* lifts the damper head 14*b*, and the damper head 14*b* is separated from the set of strings 15. The set of strings 15 is ready for vibrations.

While a player is depressing the black/white key 11*a*/11*b*, the jack 12*a* is brought into contact with the regulating button 12*c* at the toe thereof, and turns in the clockwise direction around the whippen assembly 12*b*. Then, the hammer roller 13*c* escapes from the jack 12*a*, and the hammer assembly 13 starts a free rotation toward the associated set of strings 15. The hammer head 13*b* strikes the set of strings 15, and the strings 15 vibrate for generating an acoustic tone.

When the depressed black/white key 11*a*/11*b* is released, the black/white key 11*a*/11*b* starts to return to the rest position, and allows the damper lever 14*a* to turn in the clockwise direction. The damper head 14*b* is brought into contact with the set of strings 15, again, and damps the vibrations of the strings 15. Thus, the acoustic piano 10 generates the acoustic tone as similar to a standard grand piano.

Three pedals PD and associated link mechanisms LK are incorporated in the pedal system PM. The pedals PD are called as a damper pedal, a sustaining pedal and a soft pedal. These pedals are well known to skilled person, and no further description is incorporated hereinbelow for the sake of simplicity.

The automatic playing system 20 is broken down into a recording sub-system 21 and a playback sub-system 22. The recording sub-system 21 comprises plural hammer sensors 21*a* respectively associated with the hammer assemblies 13, plural key sensors 21*b* respectively associated with the black/white keys 11*a*/11*b*, pedal sensors SP associated with the pedals PD, a recording unit 21*c* connected to the hammer sensors 21*a*, the key sensors 21*b* and the pedal sensors SP for generating pieces of music data information and a normalizing unit 21*d* for producing pieces of normalized music data information.

Each of the key sensors 21*b* has a shutter plate 21*e* attached to the lower surface of the associated black/white key 11*a*/11*b* and a photo sensor SF1. The photo sensor SF1 forms a part of a photo sensor matrix (see FIG. 3), and monitors the associated black/white key 11*a*/11*b* over the trajectory between the rest position and the end position. The photo sensor SF1 is connected to the recording unit 21*c*, and supplies a key position signal KP to the recording unit 21*c*. The recording unit 21*c* determines a depressing time tk at which a player depresses the black/white key 11*a*/11*b*, a depressed key velocity Vk on the way toward the end position, a releasing time at which the black/white key 11*a*/11*b* is released and a release key velocity on the way toward the rest position.

Each of the hammer sensors 21*a* has a shutter plate 21*f* and a photo sensor SE, and the photo sensor SE is connected to the recording unit 21*c* so as to supply a hammer position signal HP thereto. The recording unit 21*c* calculates a shutter velocity and, accordingly, a hammer velocity on the basis of the hammer position signal HP, and determines a time of intersecting the optical path to be an impact time at which the hammer head 13*b* is assumed to strike the associated set of strings 15 for generating the acoustic tone. The pedal sensors SP monitors the associated pedals PD, and generates pedal position signals PP representative of current pedal positions.

Thus, the key sensors 21*b*, the hammer sensors 21*a* and the pedal sensors SP report the current key positions, the current hammer positions and the current pedal positions to the recording unit 21*c*, and the recording unit 21*c* generates pieces of music data information representative of the performance. The pieces of music data information are supplied from the recording unit 21*c* to the normalizing unit 21*d*. The normalizing unit 21*d* eliminates the individuality of the silent automatic player piano from the pieces of music data information, and produces pieces of normalized music data information representative of the performance on an ideal acoustic piano. The pieces of normalized music data information are stored in a suitable data storage such as, for example, a floppy disk (see FIG. 2), a hard disk, an optical disk or a semiconductor memory device, and/ or are transferred through a data communication network (not shown).

The playback sub-system 22 includes a data analyzer 22*a*, a motion controller 22*b*, a servo-controller 22*c*, solenoid-operated key actuators 22*d* and solenoid-operated pedal actuators 22*e*. Velocity sensors are incorporated in the solenoid-operated key actuators 22*d*, respectively, and supply plunger signals Vy representative of actual velocity of the plungers to the servo-controller 22*c*. Pieces of normalized music data information representative of a performance are supplied from the data storage (not shown in FIG. 1) or a real-time communication system (not shown) to the data analyzer 22*a*. The data analyzer 22*a* analyzes the pieces of normalized music data information, and determines a target key velocity Vr on a trajectory of each black/white key 11*a*/11*b* to be reproduced in the playback, and the target key velocity Vr is varied with time t. Thus, the data analyzer 22*a* produces a series of target key velocity data (t, Vr) from the pieces of normalized music data information, and supplies the series of target velocity data (t, Vr) to the motion controller 22*b*. The motion controller 22*b* determines the target key velocity varied together with the key position on the trajectory of the black/white key 11*a*/11*b*, and instructs an amount of driving current appropriate to the target key velocity Vr to the servo-controller 22*c* for each of the black/white keys 11*a*/11*b* to be moved. The servo-controller 22*c* is responsive to the instruction of the motion controller 22*b* so as to supply a driving signal DR to the solenoid-operated key actuator 22*d* associated with the black/white key 11*a*/11*b* to be moved. While the solenoid-operated key actuator 22*d* is projecting the plunger thereof, the associated black/white key 11*a*/11*b* is moved so as to actuate the associated key action mechanism 12, and the velocity sensor reports the actual plunger velocity Vy to the servo-controller 22*c*. The servo-controller 22*c* compares the actual plunger velocity Vy with the target key velocity, i.e., the target plunger velocity to see whether or not the actual plunger velocity Vy is equal to the target key velocity Vr. If the actual plunger velocity Vy is different from the target key velocity Vy, the servo-controller 22*c* increases or decreases the amount of current. The data analyzer 22*a*, the motion controller 22*b* and the servo-controller 22*c* further control the solenoid-operated pedal actuators 22*e* as similar to the solenoid-operated key actuators 22*d,* and the solenoid-operated pedal actuators 22*e* reproduce the pedal motions in the playback.

The silent system 30 includes a shank stopper 30*a,* an electric motor (not shown) connected to the shank stopper 30*a,* a position sensor 30*b* (see FIG. 2) for detecting the current position of the shank stopper 30*a,* a tone generator 30*c* and a sound system such as a headphone 30*d* and a speaker system 30*e.* When a pianist manipulates a switch, the electric motor changes the shank stopper 30*a* between a free position and a blocking position. The hammer shanks 13*a* rebound on the shank stopper 30*a* in the blocking position before the hammer heads 13*b* strike the associated sets of strings 15. On the other hand, when the shank stopper 30*a* is in the free position, the hammer heads 13*b* strike the associated sets of strings 15 without any interference of the shank stopper 30*a.* Thus, the silent system 30 allows the pianist to finger on the keyboard 11 without acoustic tones. While the player is playing a tune on the keyboard 11, the tone generator 30*c* produces an audio signal from the pieces of normalized music data information each representative of a key code, a velocity, a key-on event, a hammer-on event, a key-off event etc., and supplies the audio signal to the headphone 30*d.* Then, the headphone 30*d* generates electronic sounds corresponding to the acoustic tones to be generated by the strings 15. When pieces of music data information representative of the pedal motions are supplied to the tone generator 30*c,* the tone generator 30*c* imparts the predetermined effects to electronic sounds. In the following description, a performance without any interference of the shank stopper 30*a* is referred to as "standard performance", and a performance under the shank stopper 30*a* in the blocking position is referred to as "silent performance".

Figure 2:
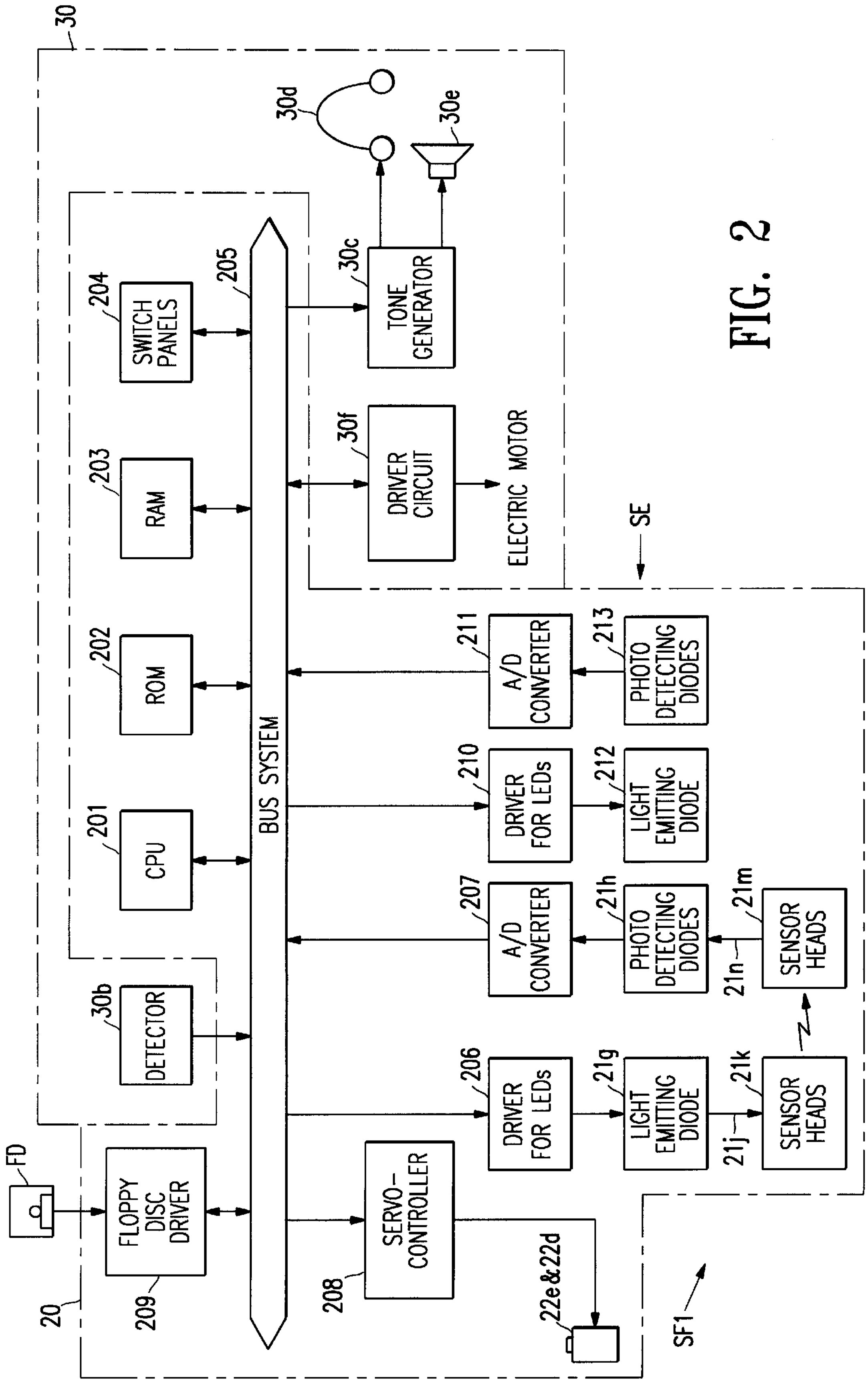
FIG. 2 is a block diagram showing the circuit arrangement of an electronic system incorporated in the silent automatic player piano.

FIG. 2 illustrates the arrangement of the automatic playing system 20 and the silent system 30. The automatic playing system 20 includes a central processing unit 201, a read only memory 202 and a random access memory 203, which are respectively abbreviated as "CPU", "ROM" and "RAM" in FIG. 2. Computer programs and various tables are stored in the read only memory 202, and the random access memory 203 serves as a working memory. A key-rank table is stored in the random access memory 203, and defines the relation between the eighty-eight black/white keys 11*a*/11*b* and pieces of rank data information. The key-rank table is hereinlater described in detail. In this instance, the recording unit 21*c,* the normalizing unit 21*d,* the data analyzer 22*a* and the motion controller 22*b* are implemented by the central processing unit 201 and the computer programs.

The automatic playing system 20 further includes a manipulating switch panel 204, and a bus system 205 is connected to the central processing unit 201, the read only memory 202, the random access memory 203, the manipulating switch panel 204 and other system components described hereinbelow in detail. The central processing unit 201 sequentially fetches the instruction codes of the computer program, and executes them so as to produce pieces of music data information and instruct the other system components.

The automatic playing system 20 further includes a driver 206 for light-emitting diodes, an analog-to-digital converter 207, a servo-controller 208 and a floppy disk driver 209. The central processing unit 201 instructs the driver 206 to sequentially energize the light emitting diodes 21*g,* and the light is propagated through optical fibers 21*j* to light-emitting sensor heads 21*k.* The light is incident onto light-receiving sensor heads 21*m,* and the incident light is propagated through optical fibers 21*n* to the photo detecting diodes 21*h.* The photo detecting diodes 21*h* covert the light to photo current, and produce analog key position signals each representative of the amount of photo current. The amount of photo current is proportional to current key position of the associated black/white key 11*a*/11*b.* The analog key position signals are converted to digital key position signals KP, and the central processing unit 201 acquires pieces of data information representative of the amount of photo current and, accordingly, the current key positions. The eighty-eight black/white keys 11*a*/11*b* are divided into plural groups, and the driver 206 energizes the light emitting diodes 21*g* in such a manner that the photo sensors SF1 sequentially check the plural groups of black/white keys 11*a*/11*b.* For this reason, the central processing unit 201 can determine key codes assigned to the black/white keys 11*a*/11*b* presently checked by the photo sensors SF1 on the basis of the timing for selectively energizing the light emitting diodes 21*g.*

The floppy disk driver 209 is connected to the bus system 205. The floppy disk driver 209 writes the pieces of music data information into and reads out the pieces of music data information from a floppy disk FD.

The automatic playing system 20 further includes a driver 210 for light emitting diodes connected to the bus system 205, an analog-to-digital converter 211 also connected to the bus system 205, light emitting diodes 212 selectively energized by the driver 210 and photo detecting diodes 213 converting incident light to photo current. The photo sensor SE is implemented by the combination of the light emitting diode 212 and the associated photo detecting diode 213.

A driver circuit 30*f* is connected to the bus system 205, and the central processing unit 201 instructs the driver circuit 30*f* to rotate the electric motor from the free position to the blocking position or the vice versa. The detector 30*b* monitors the hammer stopper 30*a.* When the hammer stopper 30*a* reaches the free position or the blocking position, the detector 30 reports the arrival at the free/blocking position to the central processing unit 201. Then, the central processing unit 201 instructs the driver circuit 30*f* to stop the electric motor.

Figure 3:
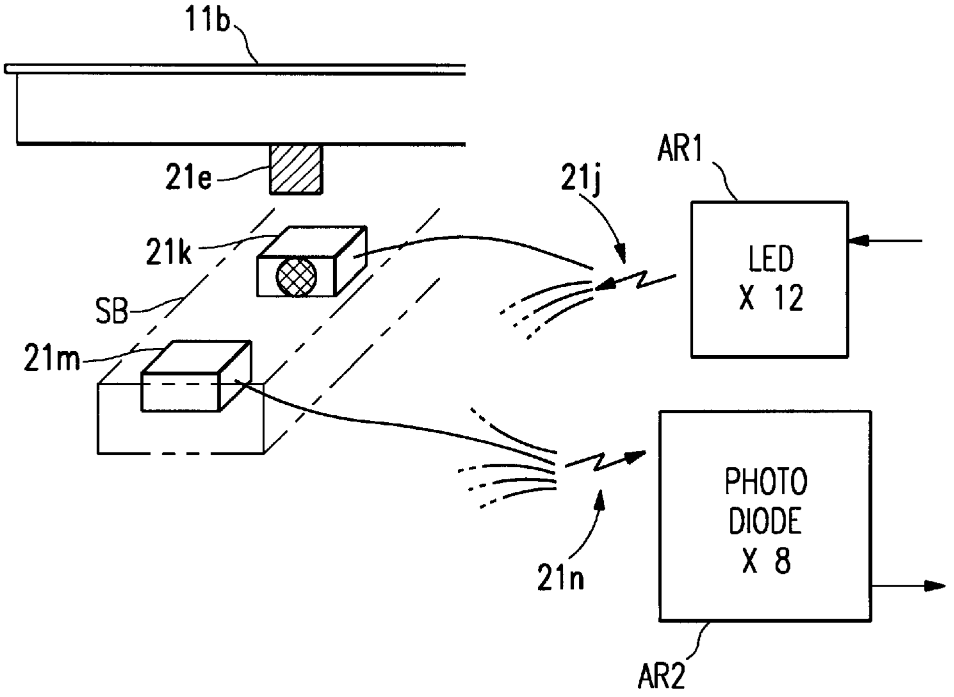
FIG. 3 is a schematic view showing a key sensor matrix incorporated in the silent automatic player piano.

FIG. 3 illustrates the optical sensor matrix. Although the optical sensor matrix is used for eighty-eight black/white keys, only one white key 11*b* is shown in FIG. 3. The shutter plate 21*e* is attached to the lower surface of the white key 11*b,* and is hatched in FIG. 3 for the purpose of discrimination. The optical sensor matrix includes the light emitting sensor head 21*k,* the light receiving sensor head 21*m,* the light emitting diodes 21*g,* the photo detecting diodes 21*h* and the bundles of optical fibers 21*j* and 21*n.* The light emitting sensor head 21*k* and the light receiving sensor head 21*m* are fixed to a frame SB together with other light emitting sensor heads (not shown) and other photo detecting sensor heads (not shown), and are spaced from one another. Twelve light emitting diodes 21*g* form an array AR1, and eight photo-detecting diodes form an array AR2. One of the light emitting diodes 21*g* is connected through an optical fiber of the bundle 21*j* to the light emitting sensor head 21*k,* and the light receiving sensor head 21*m* is connected through an optical fiber of the bundle 21*n* to one of the photo detecting diodes 21*h.* Each of the light emitting diodes 21*g* is connected to eight optical fibers of the bundle 21*j,* and twelve optical fibers of the bundle 21*n* are connected to each photo detecting diode 2*h.* For this reason, eight light emitting sensor heads 21*k* concurrently radiate the eight optical beams, and the eight photo detecting diodes 21*h* simultaneously receive the light transferred from the associated light receiving sensor heads 21*m* through the optical fibers 21*n*. Although the combinations of the light emitting diodes 21*g* and the photo detecting diodes 21*h* are ninety-six, only eighty-eight combinations are used for the eighty-eight black/white keys 11*a*/11*b*.

When the light emitting diode 21*g* is energized, the light emitting diode 21*g* generates light. The light is propagated through the optical fiber 21*j* to the light emitting sensor head 21*k*, and the light emitting sensor head 21*k* radiates a light beam to the light receiving sensor head 21*m* across the trajectory of the shutter plate 21*e*. The light beam is 5 millimeter in diameter. The light receiving sensor head 21*k* receives the light beam, and the incident light is propagated through the optical fiber 21*n* to the associated photo detecting diode 21*h*. The photo detecting diode 21*h* converts the light to the analog key position signal, and supplies the analog key position signal to the analog-to-digital converter 207.

The analog key position signal is representative of the amount of incident light. A player is assumed to depress the white key 11*b*. The white key 11*b* sinks toward the end position, and the shutter plate 21*e* gradually intersects the light beam. As a result, the amount of incident light is decreased, and, accordingly, the photo detecting diode 21*h* reduces the magnitude or the voltage of the analog key position signal.

Figure 4:
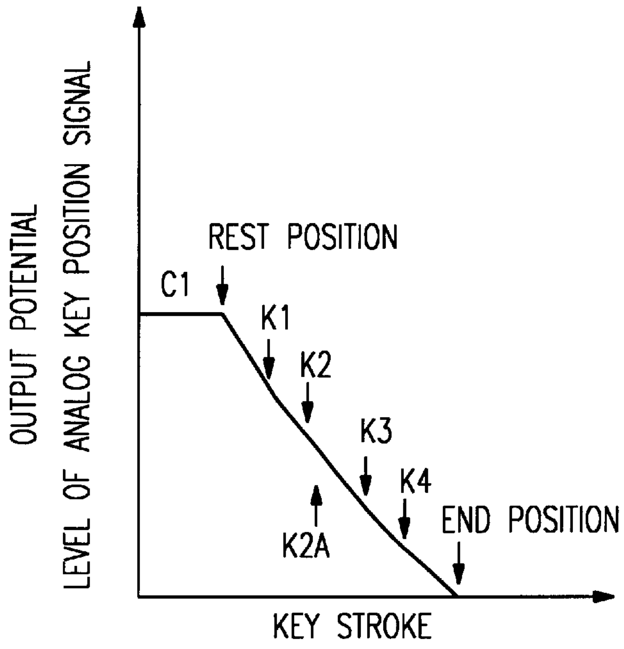
FIG. 4 is a graph showing the relation between an output potential level of an analog key position signal and a keystroke.

The position-to-voltage converting characteristics of the optical sensor matrix are represented by plots C1 in FIG. 4. The potential level of the analog key position signal linearly falls from the rest position to the end position. Detecting points K1, K2, K3 and K4 are determined so as to check the potential level of the analog key position signal as will be described hereinlater. When the shutter plate 21*e* reaches one of the detecting points K1, K2, K3 or K4, the recording unit 21*c* acknowledges that the white key 11*b* reaches a reference key position also designated by K1, K2, K3 or K4.

Figure 5:
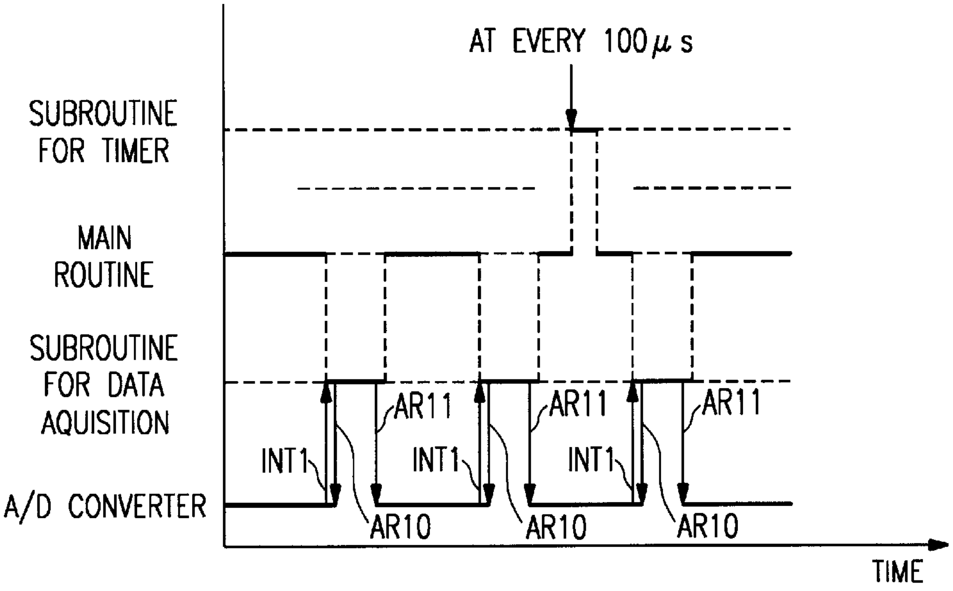
FIG. 5 is a diagram showing the relation between a main routine, a first interruption subroutine and a second interruption subroutine.

The computer program contains a main routine and two interruption subroutines. FIG. 5 illustrates the relation between the main routine and the interruption subroutines. However, the time intervals are not exactly shown in FIG. 5. The central processing unit 201 controls major part of the generation of tone signals through the main routine.

The central processing unit 201 is branched to the first interruption subroutine at intervals of 100 microseconds. In the first interruption subroutine, the central processing unit 201 increments the CPU timer, and decrements counters (not shown) each indicative of a time until a tone generation. Dots on both sides of the control transfer to the first interruption subroutine are representative of the repetition of the control transfer between the main routine and the first interruption subroutine.

On the other hand, the central processing unit 201 is branched to the second interruption subroutine at intervals of 40 microseconds for a data acquisition. When the interruption INT1 takes place, the central processing unit 201 instructs the analog-to-digital converters 207/211 to maintain the current values as indicated by arrow AR10, and the analog-to-digital converters 207/211 successively send the four digital key position signals KP or the four digital hammer position-signals HP to the central processing unit 201. Upon completion of the data acquisition, the central processing unit 201 instructs the analog-to-digital converters 207/211 to restart the analog-to-digital conversion as indicated by arrow AR11. The central processing unit 201 gives the priority to the first interruption subroutine, because the timer defines the fundamental timings in the tone generation.

Figure 6:
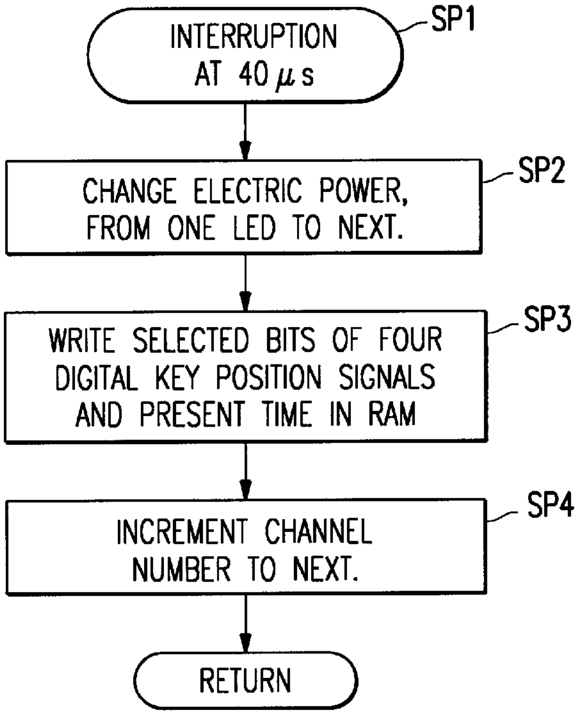
FIG. 6 is a flowchart showing the second interruption subroutine.

FIG. 6 illustrates the second timer interruption subroutine for the data acquisition. In this instance, the digital key position signal KP and the digital hammer position signal HP are 10-bit code, and the central processing unit 201 processes 8-bit data code. In the following description, only the digital key position signals KP are described. However, the digital hammer position signals HP are transferred to the central processing unit 201 as similar to the digital key position signals KP.

Figure 7:
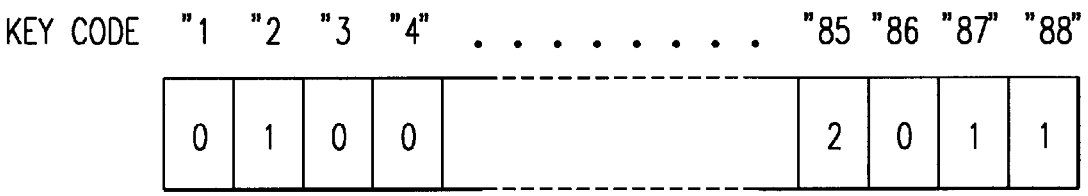
FIG. 7 is a view showing a key-rank table defined in a random access memory of the automatic playing system.

As described hereinbefore, the key-rank table is stored in the random access memory 203. FIG. 7 illustrates the key-rank table defined in the random access memory 203. The key codes "1", "2", "3", "4", . . . "85", "86", "87" and "88" are respectively assigned to the black/white keys 11*a*/11*b*, and ranks are selectively given to the black/white keys 11*a*/11*b*. The pieces of rank data information are representative of the ranks "0", "1", "2". For example, rank "2" is given to the black/white key assigned the key code "85". Description is hereinlater made on how the rank is given to each black/white key 11*a*/11*b*.

The analog-to-digital converter 207 is synchronous with the central processing unit 201. Upon completion of the analog-to-digital conversion from the four analog key position signals to the four digital key position signals, the analog-to-digital converter 207 requests the interruption to the central processing unit 201. The four digital key position signals KP are representative of the current positions of the associated four black/white keys 11*a*/11*b*, and are assigned to a channel. The eighty-eight black/white keys 11*a*/11*b* require twenty-four channels, and the digital key position signals KP are sequentially transferred to the central processing unit 201 through the twenty-four channels.

When the interruption is requested, the central processing unit 201 is branched to the second interruption subroutine as by step SP1. The central processing unit 201 instructs the LED driver 206 to remove the electric power from one of the light-emitting diodes 21*g* already energized, and further instructs the LED driver 206 to energize the next light-emitting diode 21*g* as by step SP2. The central processing unit 201 instructs the analog-to-digital converter 207 to stop the digital-to-analog conversion on the four black/white keys 11*a*/11*b* associated with the light-emitting diode 21*g* just deactivated.

Figure 8:
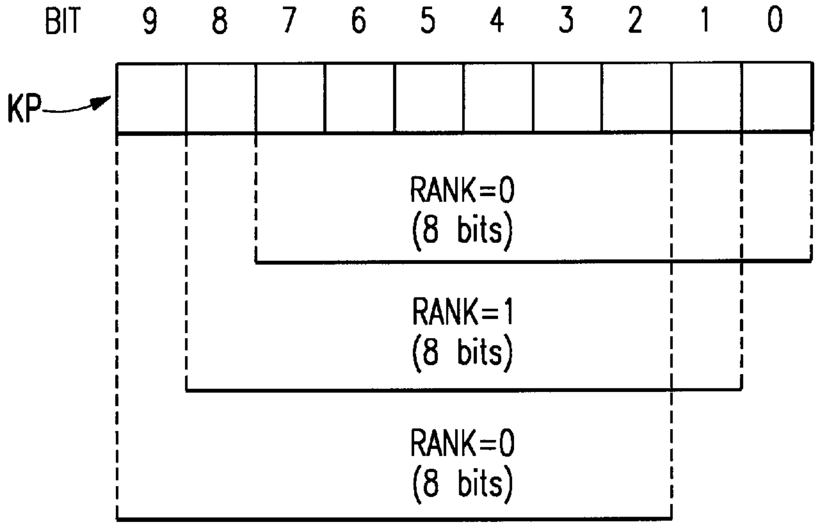
FIG. 8 is a view showing a relation between ranks and bits to be selected from a digital key position signal.
Figure 9:
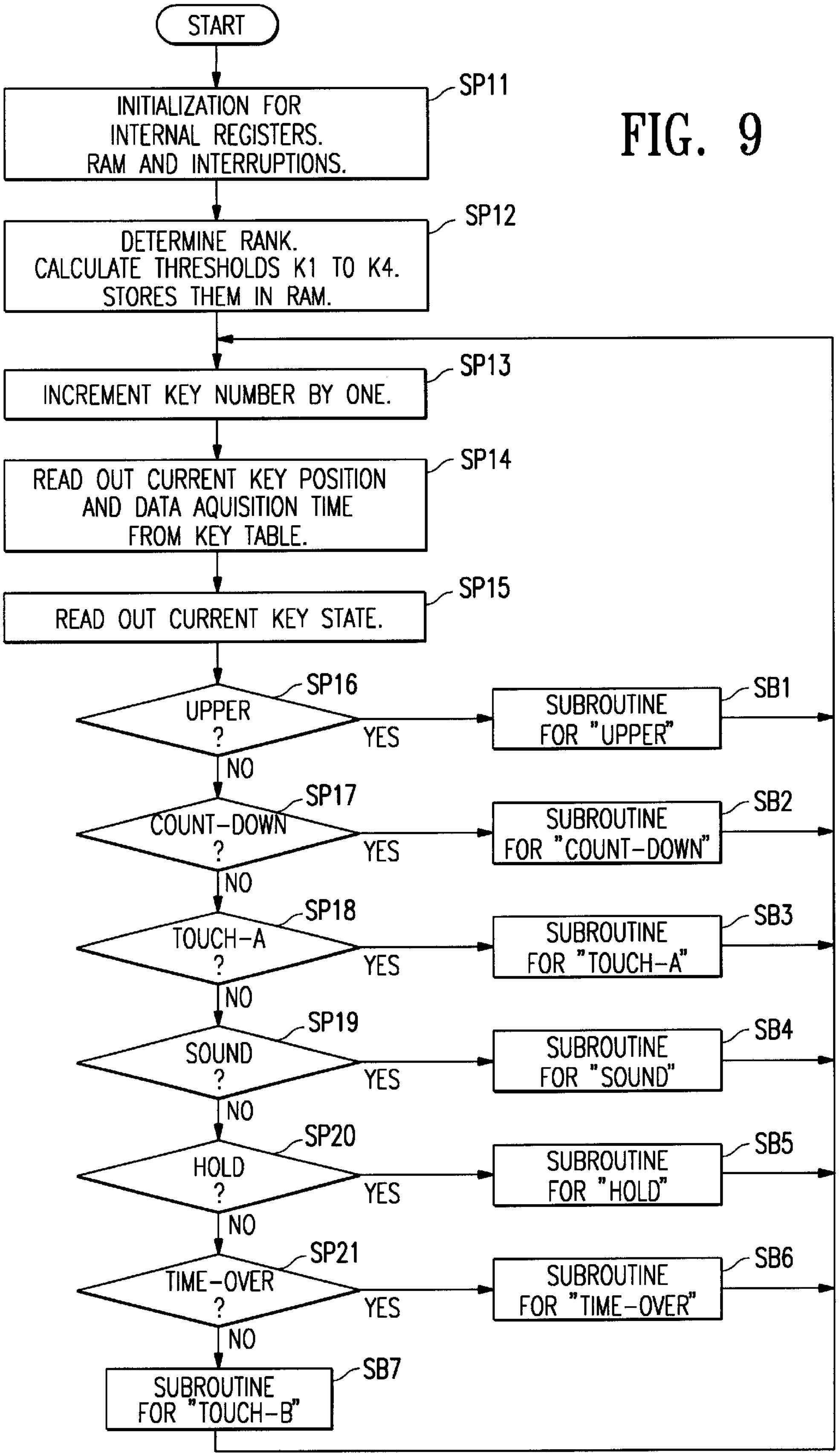
FIG. 9 is a flowchart showing the main routine.

The central processing unit 201 accesses the key-rank table, and fetches the pieces of rank data information of the four black/white keys 11*a*/11*b* associated with the channel previously activated. The central processing unit 201 checks the pieces of rank data information to determine what data bits of each digital key position signal are to be processed. FIG. 8 illustrates the relation between the bits to be processed and the pieces of rank data information. The four digital key position signals KP for the black/white keys "85", "86", "87" and "88" are, by way of example, transferred to the central processing unit 201. Then, the central processing unit 201 fetches the pieces of rank data information representative of rank "2", "0", "1" and "1", respectively. The rank "0" represents eight bits, i.e., from bit "0" to bit "7", and the central processing unit 201 selects the eight bits "0" to "7" from the digital key position signal KP for the black/white key "86". The rank "1" represents eight bits "1" to "8", and the central processing unit 201 selects the bits "1" to "8" from the digital key position signal KP for the black/white keys "87" and "88". The rank "2" represents eight bits "2" to "9", and the central processing unit 201 selects the eight bits "2" to "9" from the digital key position signal KP for the black/white key "85". Thus, the central processing unit 201 selects eight bits to be processed from the 10-bit digital key position signal KP depending upon the piece of rank data information.

Subsequently, the central processing unit 201 transfers the eight bits selected from each of the digital key position signals KP and the present time to the random access memory 203, and writes the selected bits of the four digital key position signals KP and the present time therein as by step SP3. The four digital key position signals KP are assumed to be converted from the analog key position signals and transferred to the central processing unit 201 at the present time. The present time is hereinlater referred to as "data acquisition time". Thus, only the selected bits are stored as the digital key position signals KP representative of the current key positions.

Subsequently, the central processing unit 201 proceeds to step SP4, and increments the channel number from that associated with the four black/white keys 11*a*/11*b* already processed at step SP3 to the next. Then, the analog-to-digital converter 207 restarts the analog-to-digital conversion. Thus, the central processing unit 201 intermittently activates the analog-to-digital converter 207, and sequentially determines the current key positions of the eighty-eight black/white keys 11*a*/11*b*. After step SP4, the central processing unit 201 returns to the main routine.

As described hereinbefore, the central processing unit 201 periodically renews the current key positions through the second interruption subroutine, and produces the pieces of music data information. The central processing unit 201 is assumed to supply the pieces of music data information to the tone generator 30*c* for generating electronic sounds.

When the automatic playing system is powered on, the central processing unit 201 carries out initializations for the internal registers, the random access memory 203 and the interruptions as by step SP11.

Subsequently, the central processing unit 201 proceeds to step SP12. The central processing unit 201 instructs the driver 206 to sequentially energize the light emitting diodes 21*g*, and successively fetches the digital key position signals KP representative of the current key positions of the eighty-eight black/white keys 11*a*/11*b* at the rest positions. The central processing unit 201 selects one of the black/white keys 11*a*/11*b*, and checks the digital key position signal KP of the selected black/white key 11*a*/11*b* to see whether or not the value X of the digital key position signal KP is less than 256 or $2^8$. If the answer is affirmative, the central processing unit 201 gives rank "0" to the digital key position signal KP, and writes "0" in the key-rank table together with the key code assigned to the black/white key 11*a*/11*b*. The rank "0" is representative of the eight bits from bit "0" to bit "7" to be processed. The central processing unit 201 calculates the reference key positions K1, K2, K2A, K3 and K4 on the basis of the selected bits of the digital key position signal KP. The central processing unit 201 stores the values of the reference key positions K1 to K4 together with the selected bits of the digital key position signal KP. Thus, the central processing unit 201 determines the rank, the selected bits and the reference key positions K1 to K4 for each of the eighty-eight black/white keys 11*a*/11*b*, and stores them in the random access memory 203.

On the other hand, if the answer is given negative, the central processing unit 201 checks the digital key position signal KP to see whether or not the value X is not less than 256 but less than 512. If the answer is given affirmative, the central processing unit 201 gives rank "1" to the digital key position signal KP, and writes "1" in the key-rank table together with the key code. The rank "1" is representative of the eight bits from bit "1" to bit "8" to be processed. The central processing unit 201 calculates the reference key positions k1, K2, K2A, K3 and K4 on the basis of the selected bits of the digital key position signal KP. The central processing unit 201 stores the values of the reference key positions K1 to K4 together with the selected bits of the digital key position signal KP. If the answer is given negative, again, the central processing unit 201 confirms that the value X is equal to or greater than 512. Then, the central processing unit 201 gives rank "2" to the digital key position signal KP, and writes "2" in the key-rank table together with the key code. The rank "2" is representative of the eight bits from bit "2" to bit "9" to be processed. The central processing unit 201 calculates the reference key positions K1, K2, K2A, K3 and K4 on the basis of the selected bits of the digital key position signal KP. The central processing unit 201 stores the values of the reference key positions K1 to K4 together with the selected bits of the digital key position signal KP. The key code and the reference key positions K1 to K4 form a part of a key table defined in the random access memory 203. Thus, the central processing unit 201 repeats the above-described sequence for the eighty-eight black/white keys 11*a*/11*b* so as to complete the key-rank table and the part of the key table for the reference key positions K1 to K4.

The central processing unit 201 is assumed to process a b1-bit data code. The digital key position signal KP is assumed to consist of b2 bits, which is greater than b1 by n, i.e., b2=b1+n. The digital key position signal KP has value X at a reference position, i.e., the rest position. When the value X of the digital key position signal KP satisfies $2^{(z+b1)} \leqq X < 2^{(z+b1+1)}$ where z is expressed as $0 \leqq z < n$ and n is a natural number, (z+1) bit to (b1+z) bit of the digital key position signal KP are shifted to 0 bit to (b1−1) bit of the data code to be processed by the central processing unit 201.

Upon completion of the key-rank table and the part of the key table, the central processing unit 201 starts the generation of the pieces of music data information as follows. The central processing unit 201 is periodically branched to the first interruption subroutine and the second interruption subroutine as described hereinbefore, and periodically renews the current key positions of the eighty-eight black/white keys 11*a*/11*b* and the data acquisition time. In this instance, the current key positions and the data acquisition time are stored in another part of the key table.

The central processing unit 201 increments the key code of the selected black/white key 11*a*/11*b* by one as by step SP13. If the black/white key 11*a*/11*b* assigned the key code "87" is presently selected, the central processing unit 201 changes the key code to "0". As a result, the key code is looped between zero and eighty-seven, and the following steps in the main routine are executed for each of the black/white keys 11*a*/11*b*. For this reason, the term "black/white key 3*a*/3*b*" means one of the black/white keys 11*a*/11*b* presently selected.

The central processing unit 201 accesses the key table in the random access memory 203, and reads out the selected bits representative of the current key position and the data acquisition time from the key table as by step SP14.

Subsequently, the central processing unit 201 reads out current key status from yet another part of the key table as by step SP15. In this instance, ten kinds of current key status are defined as "UPPER", "TOUCH-A", "COUNT-DOWN- 0", "COUNT-DOWN-1", "COUNT-DOWN-2", "COUNT-DOWN-3", "SOUND", "HOLD", "TOUCH-B" and "TIME-OVER". The current key status "UPPER" is representative of the black/white key 11*a*/11*b* staying or moving between the rest position and the reference key position K1. The current key status "TOUCH-A" is representative of the black/white key 11*a*/11*b* exceeding the reference key position K1 but not reaching the next reference key position K2. The current key status "COUNT-DOWN-0" is representative of the black/white key 11*a*/11*b* exceeding the reference key position K2 but not reaching the next reference key position K3. The current key status "COUNT-DOWN-1" is representative of the black/white key 11*a*/11*b* exceeding the reference key position K3 but not reaching the next reference key position K4. The current key status "COUNT-DOWN-2" is representative of the black/white key 11*a*/11*b* exceeding the reference key position K4. The current key status "COUNT-DOWN-3" is representative of the black/white key 11*a*/11*b* passing through plural reference key positions at high-speed. The current key status "SOUND" is representative of the black/white key 11*a*/11*b* under the generation of the sound. The current key status "HOLD" is representative of the black/white key 11*a*/11*b* passing through the reference point K2 on the way toward the rest position. The current key status "TOUCH-B" is representative of the black/white key 11*a*/11*b* depressed after entry into the key status "HOLD" before reaching the rest position. The current key status "TIME-OVER" is representative of the black/white key 11*a*/11*b* maintained in the key status "TOUCH-B" over a predetermined time period.

The central processing unit 201 sequentially checks the current key status read out from the key table to see what key status the black/white key 11*a*/11*b* is in, and is selectively branched into subroutine programs.

In detail, the central processing unit 201 firstly checks the current key status to see whether or not the black/white key 3*a*/3*b* is in the key status "UPPER" as by step SP16. If the answer at step SP16 is given affirmative, the central processing unit 201 enters the subroutine SB1 for "UPPER". In the subroutine SB1, the central processing unit 201 confirms that the player surely depresses the black/white key 11*a*/11*b*, and assigns one of the sixteen tone generation channels to the depressed black/white key 11*a*/11*b*. If the conditions are matched, the central processing unit 201 changes the current key status. Upon completion of the subroutine SB1, the central processing unit 201 returns to step SP13.

If the answer at step SP16 is given negative, the central processing unit 201 checks the current key status to see whether or not the black/white key 11*a*/11*b* is in any one of the four kinds of key status "COUNT-DOWN-0", "COUNT-DOWN-1", "COUNT-DOWN-2" and "COUNT-DOWN-3" as by step SP17. If the answer at step SP17 is given affirmative, the central processing unit 201 is branched to a subroutine SB2 for "COUNT-DOWN". In the subroutine SB2, the central processing unit 201 changes a value representative of a time period until generation of sound, if necessary, and decrements the value. The value is-stored in a tone generation table for the sixteen tone generation channels. If the conditions are matched, the central processing unit 201 changes the current key status. Thereafter, the central processing unit 201 returns to step SP13.

On the other hand, if the answer at step SP17 is given negative, the central processing unit 201 checks the current key status to see whether or not the black/white key 11*a*/11*b* is in the key status "TOUCH-A" as by step SP18. If the answer at step SP18 is given affirmative, the central processing unit 201 is branched to a subroutine SB3. In the subroutine SB3, the central processing unit 201 determines the value representative of the time period until the tone generation, and writes the value in the tone generation table. If the conditions are matched, the central processing unit 201 changes the current key status. Then, the central processing unit 201 returns to step SP13.

If the answer step SP18 is given negative, the central processing unit 201 checks the current key status to see whether or not the black/white key 11*a*/11*b* is in the key status "SOUND" as by step SP19. When the time period until the tone generation reached zero, the central processing unit 201 instructed the tone generation channel to generate the sound, and the headphone 30*d* has generated the sound. As a result, the black/white key 11*a*/11*b* enters the key status "SOUND". If the answer at step SP19 is given affirmative, the central processing unit 201 is branched to a subroutine SB4. In the subroutine SB4, the central processing unit 201 checks the current key position to see whether or not the black/white key 11*a*/11*b* has passed the reference key position K2 on the way to the rest position. If the answer is given negative, the central processing unit 201 instructs the tone generation channel to damp the sound. The damping ratio is dependent on the current key position with respect to the reference key position K2A. If the above-described conditions are matched, the central processing unit 201 changes the current key status. Thereafter, the central processing unit 201 returns to step SP13.

If the answer step SP19 is given negative, the central processing unit 201 checks the current key status to see whether or not the black/white key 11*a*/11*b* is in the key status "HOLD" as by step SP20. If the answer at step SP20 is given affirmative, the central processing unit 201 is branched to a subroutine SB5. In the subroutine SB5, the central processing unit 201 changes the current key status depending upon the current key position, and assigns a tone generation channel to the black/white key when the player intends to generate the sound. Thereafter, the central processing unit 201 returns to step SP13.

If the answer step SP20 is given negative, the central processing unit 201 checks the current key status to see whether or not the black/white key 11*a*/11*b* is in the key status "TIME-OVER" as by step SP21. If the answer at step SP21 is given affirmative, the central processing unit 201 is branched to a subroutine SB6. In the subroutine SB6, the central processing unit 201 keeps or changes the current key status depending upon the current key position. Then, the central processing unit 201 returns to step SP13.

If the answer step SP21 is given negative, the central processing unit 201 is branched to a subroutine SB7. When the player strongly depressed the black/white key 11*a*/11*b*, the black/white key 11*a*/11*b* entered the key status "TOUCH-B". In the subroutine SB7, the central processing unit 201 gives the maximum velocity or calculates the velocity appropriate to the key motion, and gives a corresponding value representative of the time period until the tone generation. Then, the central processing unit 201 returns to step SP13.

Thus, the central processing unit 201 frequently checks the current key position in the main routine, and compares the current key position with the reference key positions K1 to K4. The current key position is represented by the selected bits of the digital key position signal KP as similar to the reference key positions K1 to K4. This results in a high resolution of the current key position without overflow. For this reason, the central processing unit 201 exactly determines the current key status, and accurately controls the tone generation.

As will be appreciated from the foregoing description, the automatic player piano according to the present invention exactly determines the timings at which the black/white keys 11*a*/11*b* pass the reference key positions K1 to K4 by Virtue of the pieces of rank data information. The exact determination of the timings results in the appropriate tone generation. Thus, the automatic player piano according to the present invention faithfully produces the electronic sounds or faithfully reproduces an original performance through generation of the acoustic tones.

The central processing unit 201 determines the selected bits after the initialization by itself. Even if the key sensors 21*b* change the output values of the analog key position signals due to aged deterioration, the pieces of rank data information are automatically changed to the appropriate rank. Thus, the automatic player piano can keep the resolution high at all times.

In the above-described embodiment, the central processing unit 201 and step SP12 realize a rank assignor, and the central processing unit 201 and steps SP12 and SP3 realize an extractor.

Although the particular embodiment of the present invention has been shown and described, it will be obvious to those skilled in the art that various changes and modifications may be made without departing from the spirit and scope of the present invention.

In another embodiment, the digital key position signal KP and the data code to be processed by the central processing unit 201 may consist of b2 and b1, respectively, and b2 is equal to b1+n where n is a natural number more than 1. When the value X of the digital key position signal KP satisfies $2^{(z+b1)} \leqq X < 2^{(z+b1+1)}$ where z is expressed as $1 \leqq z < n$, the (z+1) bit to (b1+z) bit of the digital key position signal KP is shifted to 0 bit to (b1−1) bit of the data code to be processed by the central processing unit 201.

The bit string of the digital key position signal KP may be shifted to higher order bits by n bit or n bits depending upon the pieces of rank data information. When the rank is “0” and “1”, the bits of the digital key position signal KP are shifted to higher order bits by 2 bits and 1 bit, respectively, and the second bit to the ninth bit are processed by the central processing unit 201 at all times.

Similarly, when the rank is “0” and “2”, the bits of the digital key position signal KP are shifted to the higher order bits by 1 bit and to the lower order bits by 1 bit, respectively, and the first bit to the eighth bit are processed by the central processing unit 201 at all times.

The present invention is applicable to pedal sensors SP and/ or hammer sensors 21*a*. The keyboard musical instrument may be a combination between an acoustic piano and a silent system or a combination between an acoustic piano and an automatic playing system.

In the above-described embodiment, the ranks are assigned to the digital key position signals KP at the rest positions. Another embodiment may assign the ranks to the digital key position signals KP at every interruption for the data acquisition in a real time manner. If the aged deterioration is ignorable, the pieces of rank data information may be fixedly stored in the read only memory.

What is claimed is:

1. A keyboard musical instrument for generating pieces of music data information representative of a performance thereon, comprising:

plural manipulators movable along respective trajectories between respective home positions and respective limit positions;

a sound generating system generating sounds, and changing an attribute of said sounds depending upon current positions of said plural manipulators selectively depressed between said home positions and said limit positions;

plural position sensors respectively associated with said plural manipulators and producing digital position signals expressed by a first bit string and representative of said current positions, respectively;

a data converter including a rank assignor analyzing values of said digital position signals generated under reference state and assigning one of ranks representative of different parts of said first bit string to each of said digital position signals depending upon the value under said reference state, and an extractor connected to said rank generator and extracting the part of said first bit string specified by said one of said ranks from said each of said digital position signals for generating associated one of digital data signals expressed by a second bit string different in the number of component bits from said first bit string; and a data processor supplied with said associated one of said digital data signals and supplying a part of music data information to said sound generating system so as to make said sound generating system to change said attribute of said sounds.

2. The keyboard musical instrument as set forth in claim 1, in which said plural manipulators are keys of a keyboard moved between rest positions corresponding to said home positions and end positions corresponding to said limit positions.

3. The keyboard musical instrument as set forth in claim 1, when said value of said each of said digital position signals generated under said reference state satisfies $$2^{(z+b1)} \leqq X < 2^{(z+b1+1)}$$

where b1 is the number of component bits of said associated one of said digital data signals, b2 is the number of component bits of said each of said digital position signals and is greater than b1 by n, n is a natural number, z is expressed as $0 \leqq z < n$, X is said value of said each of said digital position signals generated under said reference state, said extractor makes (z+1) bit to (b1+z) bit of said each of said digital position signals serve as 0 bit to (b1−1) bit of said associated one of said digital data signals.

4. The keyboard musical instrument as set forth in claim 3, in which said plural manipulators are keys of a keyboard, and said reference state is created at rest positions of said keys corresponding to said home positions.

5. The keyboard musical instrument as set forth in claim 3, in which said each of said digital position signals is supplied from a pedal sensor monitoring one of pedals incorporated in said keyboard musical instrument for imparting a musical expression to said sounds.

6. The keyboard musical instrument as set forth in claim 1, when said value of said each of said digital position signals generated under said reference state satisfies $$2^{(z+b1)} \leqq X < 2^{(z+b1+1)}$$

where b1 is the number of component bits of said associated one of said digital data signals, b2 is the number of component bits of said each of said digital position signals and is greater than b1 by n, n is a natural number greater than 1, z is expressed as $-1 \leqq z < n$, X is said value of said each of said digital position signals generated under said reference state, said extractor makes (z+1) bit to (b1+z) bit of said each of said digital position signals serve as 0 bit to (b1−1) bit of said associated one of said digital data signals.

7. The keyboard musical instrument as set forth in claim 6, in which said plural manipulators are keys of a keyboard, and said reference state is created at rest positions of said keys corresponding to said home positions.

8. The keyboard musical instrument as set forth in claim 6, in which said each of said digital position signals is supplied from a pedal sensor monitoring one of pedals incorporated in said keyboard musical instrument for imparting a musical expression to said sounds.

9. The keyboard musical instrument as set forth in claim 2, in which said sound generating system includes plural key action mechanisms respectively connected to said keys and actuated when the associated keys are depressed, plural hammers respectively associated with said plural key action mechanisms and driven for rotation by the associated key action mechanisms when said associated keys are depressed, plural strings respectively associated with said plural hammers and struck with the-associated hammers driven for rotation by said associated plural key action mechanisms so as to generate said sounds, plural damper mechanisms respectively associated with said plural strings and said keys, spaced from the associated strings by said associated keys before said associated hammers strike and brought into contact with said associated strings by said keys moved toward said rest positions for damping vibrations of said associated strings, and key actuators respectively associated with said keys and responsive to said part of said music data information for selectively driving said associated keys without fingering of a player.

10. The keyboard musical instrument as set forth in claim 9, further comprising a silent system having a hammer stopper changed between a free position and a blocking position, said hammer stopper in said free position allowing said hammers to strike said associated strings, said hammer stopper in said blocking position causing said hammers to rebound thereon before striking said associated strings, and an electronic sound generating system responsive to said part of said music data information for electronically generating said sounds.

* * * * *